Feb. 10, 1959  H. ALLEN  2,873,085
VALVE
Filed April 9, 1956  3 Sheets-Sheet 1

Herbert Allen
INVENTOR.

BY
ATTORNEYS

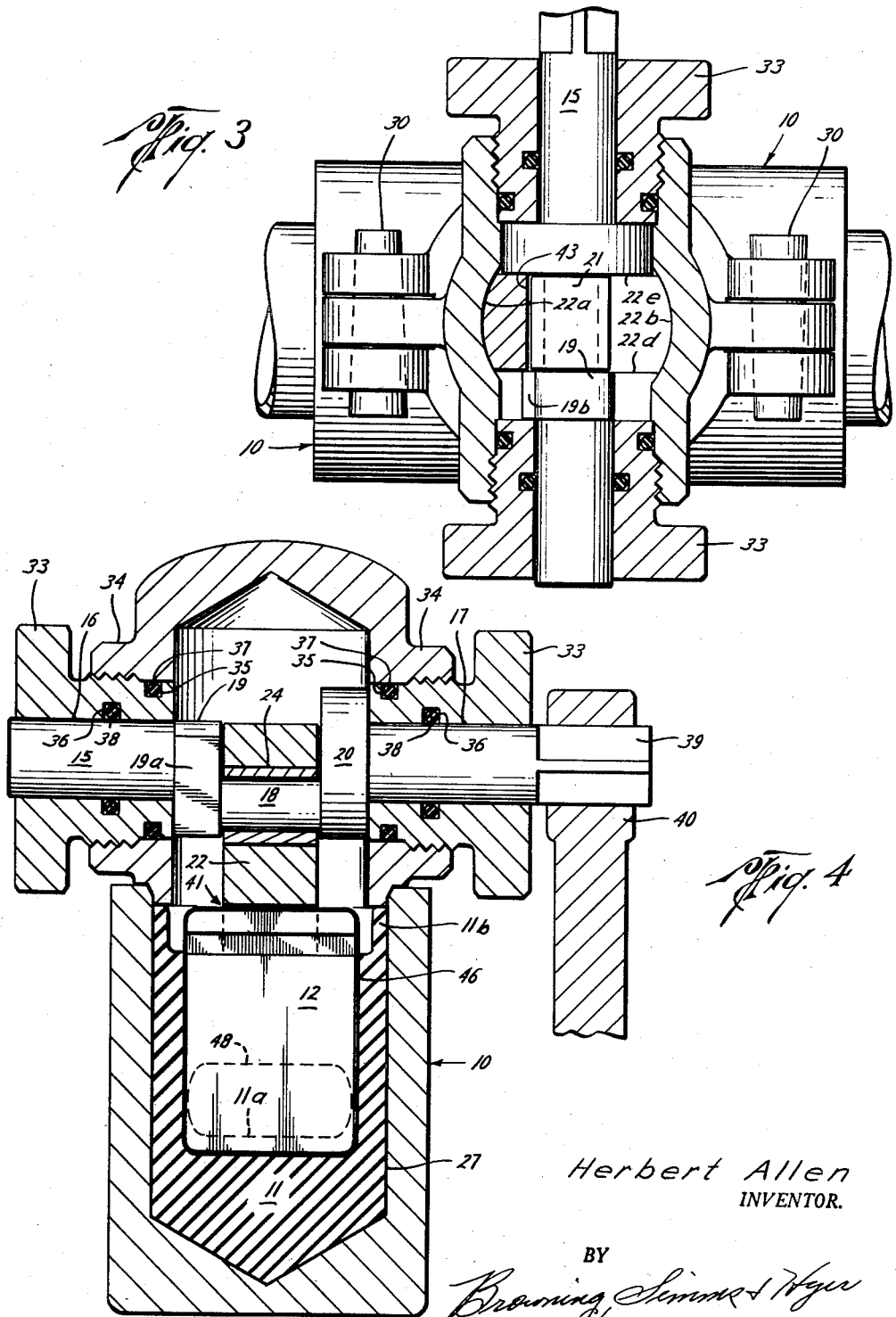

Feb. 10, 1959 H. ALLEN 2,873,085
VALVE
Filed April 9, 1956 3 Sheets-Sheet 3

LEGEND
A - STEM OPERATED GATE VALVE
B - STEM OPERATED GATE VALVE
C - PLUG VALVE
D - VALVE OF FIG.'S 1 TO 4

Herbert Allen
INVENTOR.

BY
Browning, Simms & Hyer
ATTORNEYS

2,873,085

VALVE

Herbert Allen, Houston, Tex., assignor to Cameron Iron Works, Inc., Houston, Tex., a corporation of Texas Application April 9, 1956, Serial No. 577,051

2 Claims. (Cl. 251—261)

This invention relates to valves and more particularly to gate valves in which a valve member is mounted for endwise movement to and from seated position. In one important aspect it relates to a gate valve utilizing a resilient seat to control flow of a stream in which the stream is made up of both liquids and particulate solids.

Known "mud" valves for handling abrasive fluids under high pressures, such as drilling fluids, are characterized by requiring either a very high operating torque or a large amount of work to operate the valve.

It is therefore the general object of this invention to provide a "mud" valve for handling abrasive fluids under very high pressures which is operated with a low torque and requires only a small amount of total work to operate the valve member.

The most generally used form of valve for drilling mud control is the resilient seat type of gate valve. Movement of the valve member is commonly provided by relative rotation between a nut and threads on the valve stem. The mechanical advantage provided by the threads is such that the valve member may be seated or unseated with low torque. However, to open or close the valve requires a large number of rotations of the operating hand wheel.

Gate valves commonly move a valve stem or like part into the valve casing or into a pressurized portion of the valve casing under pressure. The resulting pressure differential across the valve member resists closing of the valve.

Gate valves further commonly employ circular flow passageways and the valve member still has considerable distance to travel after flow has been pinched down to a point where a substantial thrust across the valve member is present.

The foregoing results in a relatively high total work to operate the valve.

It is an object of this invention to provide a gate valve which is not subject to the above enumerated disadvantages.

Another object of this invention is to provide a gate valve which has an increased force ratio on the valve member when the downstream thrust load is greatest to avoid the need for high torque to close the valve.

Another object is to provide a gate valve with an increased force ratio on the valve member when the downstream thrust load is greatest in combination with a flow passageway so shaped that a maximum percentage of the passageway opening is covered or uncovered with each increment of movement of the valve member.

Another object is to provide a gate valve as in the preceding object which does not have a stem or other part to move into the valve casing under pressure.

Another object is to provide a gate valve as in the preceding object which does not employ threads or the like exposed to line fluid to move the gate member.

Another object is to provide a gate valve which is automatically locked in closed position and which cannot be moved therefrom except by the rotation of the operating handle.

Another object is to provide a gate valve, in which the valve member in seating distorts a resilient seat, with means for automatically locking the valve member in seated position against the force of the distorted seat to prevent unseating of the valve except by operation of the actuator handle therefor.

Other objects, features and advantages of this invention will be apparent from a consideration of the drawings, the specification and the claims.

In the drawings wherein like reference numerals indicate like parts, and wherein there is shown illustrative forms of this invention:

Fig. 3 is a view along the lines 3—3 of Fig. 2 in the direction of the arrows;

Fig. 4 is a view along the lines 4—4 of Fig. 2 in the direction of the arrows;

Figures 1, 2:
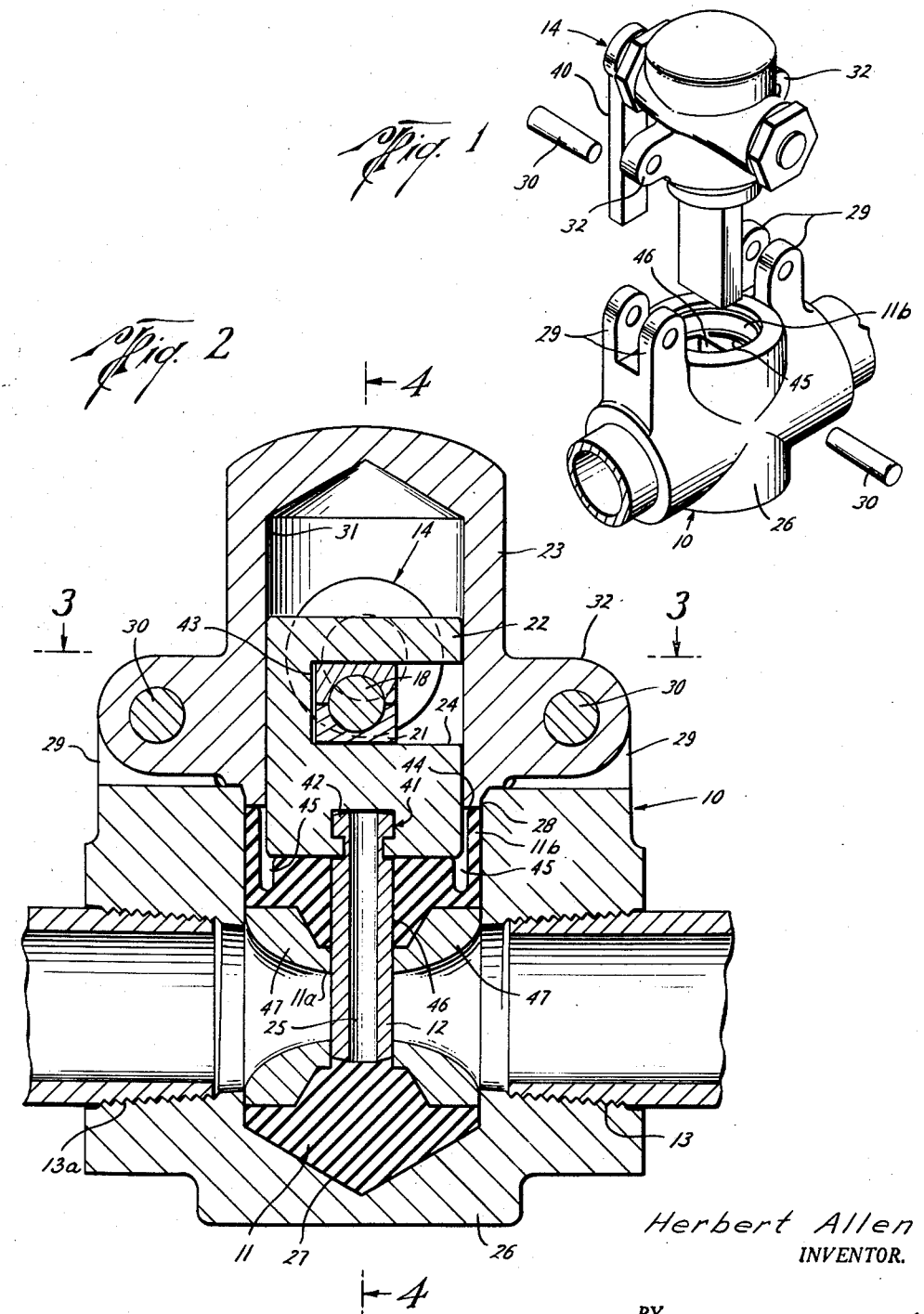
Fig. 1 is a partially exploded perspective view of the preferred form of this invention.
Fig. 2 is a view in vertical cross section through the valve of Fig. 1.

Referring first to Figs. 1 through 4, the valve casing 10 has positioned therein a valve seat insert 11 which forms with the two threaded openings 13a and 13 a flow passageway through the body. Flow through seat 11 is controlled by a paddle 12 which is moved endwise from seated to unseated position by an actuator mechanism indicated generally at 14. The end of the paddle is preferably flat and the bottom of the passageway 11a through the insert 11 likewise preferably flat to provide a large flow area with the valve almost closed. Thus, maximum mechanical advantage for closing the valve will only be necessary for a short distance of travel of paddle 12.

The actuator mechanism includes a shaft 15 which is mounted for rotation in journals 16 and 17. Shaft 15 has a crank part 18 carried by crank arms 19 and 20 for concentric rotation about the central axis of journals 16 and 17. Means are provided to translate rotary movement of the crank part into reciprocal movement of the paddle 12. This means may be provided by crank part 18 rotatably mounted in slide block 21 which is slidably carried in a groove 24 in cross head 22. Cross head 22 is slidably mounted for reciprocation within the bonnet 23 of the valve casing 10.

The cross head 22 and paddle 12 comprise the valve member for controlling the flow passageway. The cross head and paddle are separable to provide for ease of replacement of the paddle.

The relationship of the crank arm and the valve member is such that with the valve closed a line perpendicular to the rotational axis of the actuator shaft and passing through the central axis of journals 16 and 17 and the central axis of crank arm 18 would be substantially parallel to the direction of movement of the valve member.

As illustrated in Fig. 2, this condition will exist when crank part 18 is closest to valve seat 11. Upon rotation of the crank part 18 in a counter clockwise direction as viewed in Fig. 2, the slide block will move horizontally within groove 24 and will slowly raise the cross head 22 and paddle member 12. Due to the large horizontal component of movement of the crank part 18, the vertical component of movement of the valve member 12 will be small and the mechanical advantage for moving the valve in this position will be great. As the crank arm progresses counter clockwise to where the horizontal component of movement is reduced and the vertical component of movement increased, the mechanical advantage of the system will decrease and the valve member will quickly move out of the flow passageway.

As best seen in Fig. 2, a passageway 25 is provided which extends vertically through the paddle portion 12 of the valve member and provides for fluid communication between the fluid passageway through the body and the interior of bonnets 23. This fluid communication will prevent the existence of a pressure differential between the passageway and the interior of the casing outside the passageway which would tend to hinder closing of the valve member. This passageway is open while the valve member is unseated to permit free flow of fluid. After the valve member has been seated, fluid on the upstream side of the valve member will seep through seat 11 and into passageway 25 as there is no dam to hold the packing material against pressure of the upstream fluid except on the downstream side of paddle 12.

Referring now to the details of construction of the valve, the valve casing 10 includes a body 26 having a central cavity 27. The threaded openings 12 and 13 open into this central cavity and are adapted to receive theaded end pipe as shown. The cavity 27 is essentially cylindrical in shape and has a side door opening 28 at one end of the cylinder through which the valve seat 11 and the paddle portion 12 of the valve member may be inserted. The valve body 26 is provided with upstanding ears 29 to which a bonnet completing the valve casing may be pinned by knock-out pins 30.

The bonnet has a central cavity 31 which is also cylindrical in form positioned in register with the cavity 27 of the valve body. Cavity 31 is open at one end to provide for reciprocation of the cross head 22 of the valve member. The bonnet 23 is provided with ears 32 which are pinned by the knock-out pins 30 to ears 29 of the valve body 26.

The operating shaft 15 is journaled within bonnet 23 by journal nuts 33. These nuts 33 are positioned on opposite sides of bonnet 23 and are received within threaded bosses 34. Each nut 33 has a groove 35 formed in its outer periphery and a groove 36 in the journal wall thereof. O-rings 37 and 38 are provided in grooves 35 and 36 respectively and seal between the nuts and bonnet and the shaft 15 and nuts 33 respectively. The bores through bosses 34 are of sufficient diameter to pass the crank arm 19 and crank part 18 of the actuating shaft 15 to permit assembly of these parts within the bonnet.

Crank arm 19 is provided with opposite parallel flats 19a and 19b. The distance between the flats is less than the width of slot 24 so that with shaft 15 rotated to position the flats parallel with the slot, the crank arm will pass through slot 24. The slide block 21 is split so that it may be positioned about crank part 18 before the shaft is passed through cross head 22.

Crank arm 15 has one end terminating exteriorly of the body and provided with crank part 39 adapted to receive an actuator arm 40 to provide leverage for rotating the shaft 15.

The cross head 22 has two opposite walls 22a and 22b which are complementary to the cylindrical bore 31 to provide for sliding contact therewith. The other opposite walls 22c and 22d of the cross head 22 are flat to permit the cross head passing between the crank arms 19 and 20 as the shaft 15 is rotated.

The cross head 22 is provided in its underside with a T slot indicated generally at 41 for receiving a complementary T carried by the upper end of the paddle portion 12 of the valve member. It will be noted from Fig. 2 that the T slot 41 may be extended below the bonnet 23 to permit the paddle 12 to be removed by laterally disengaging the T of the paddle from the T slot 41.

The horizontal slot 24 in cross head 22 is open at one end to permit ready milling out of the slot, but it will be understood that the slot might not extend to both the walls 22a and 22b of the cross head. In either event, a bottom or side wall 43 should be provided which will be abutted by the slide block 21 when the crank part 18 has been rotated to a position slightly past the point at which it moves paddle 12 into fully seated position. With this arrangement, any forces tending to unseat paddle 12 will tend to move the slide block into tighter abutment with the side wall 43 so that the valve member will be automatically locked in its seated position.

While the throw of the crank arms 19 and 20 might be such that the valve would be in full open position with the crank arm in the neighborhood of 45° as viewed in Fig. 2, it is preferred that the crank part 18 move slightly more than 180° between fully closed and fully open position. Having the valve at fully open position at 45° would give the ultimate result of a high mechanical advantage when the valve is moving between seated and cranked position and a low mechanical advantage during the remainder of travel of the valve member. On the other hand, it is preferred that the valve member be automatically locked in open position and for this reason, the crank part 18 is preferred to rotate through slightly more than 180° and to again come in contact with the side wall 43 of slot 24 with the valve member in full open position and the crank part 18 rotated slightly past center so that accidental closing of the valve member will be automatically prevented.

A seal may be provided between the body and bonnet of the valve casing in any desired manner. For instance, an upstanding annular flange 11b may be provided on the seat portion of seat 11 which flange is distorted by the wall of cavity 27 as the seal is moved into the cavity to provide an initial interference between the flange 11b and the wall of cavity 27. The bonnet 23 has an underface 44 which engages the end of flange 11b. and compresses the flange to provide an initial interference seal between the bonnet and the flange. With this arrangement, fluid introduced into the bonnet through passageway 25 will act upon the annular flange 11b to seal the flange to the valve body 26 and to the bonnet 23.

It will be noted that grooves 45 are formed just inwardly of the annular flange 11b and extends concentrically therewith to points just short of slot 46 in which the paddle reciprocates. As the cross head 22 moves downwardly it engages the resilient portion of the seat insert and distorts it slightly. With a new insert the resilient portion of the seat will flow under this distorting force into grooves or slots 45. As the seat wears in use, this distorting force of the cross head 22 will tend to flow material to replace the worn away material instead of into grooves 45. In this way the life of the seat insert 11 will be prolonged.

It will be appreciated that to replace the seat insert it is only necessary to drive out the knockout pins 30, lift the bonnet and paddle out of the way as illustrated in Fig. 1 to permit removal and replacement of the seat insert 11.

To explain the operation of the device, let it be assumed that there is a pressure fluid confined to one side of paddle 12 and that the other side is under little or no pressure so that the downstream thrust load on the paddle 12 will hold it firmly against one of the metal liners 47 of seat insert 11. This thrust will also hold the liner in firm contact with the wall of bore 27. Thus, a dam will be provided against which the resilient material of the seat may be compressed to provide a seal on the downstream side of paddle 12. It is not likely that such a dam will exist on the upstream side of the paddle and fluid will tend to leak around the upstream side of the paddle and up through the slot through paddle 12 and into the interior of the bonnet. If desired, this characteristic of the valve may be relied upon to pressurize the interior of the bonnet to maintain substantially the same pressure within the bonnet and the upstream side of the valve. It is preferred, however, to provide the passageway 25 or some similar means for providing a direct passageway between the flow passageway through the valve and the bonnet to insure that fluid freely flows into the bonnet. Further, if desired, this communication may be provided by other means but the passageway is preferably in the center or in the edge walls of the paddle so that the valve will control flow in either direction through the fluid passageway.

When it is desired to open the valve, the handle 40 is rotated in a counter clockwise direction as viewed in Fig. 2 and during the first few degrees of such rotation, the horizontal component of movement of the crank part 18 will be greater than the vertical component of movement and a large mechanical advantage will be provided for unseating of paddle member 12. It is desired that the valve be designed so that the paddle 12 will open the passageway through the seat 11 slightly while this horizontal component is greater than the vertical component of movement. Once the passageway through the seat is opened slightly, the thrust on the paddle 12 reduces and the large mechanical advantage is not needed to further unseat the valve. To provide a large flow through insert 11 with small movement of paddle 12, the flow passageway at slot 46 is shaped to provide maximum increase in opening of the passageway for each increment of movement of paddle 12 from fully seated position. Preferably the paddle is blunt or square nosed with straight sides and the flow passageway through the insert is rectangular with relatively long walls extending perpendicular to the direction of movement of paddle 12. See Fig. 4 wherein the passageway through the center of the seat is indicated in dashed outline 48. With this form of seat substantially the entire width of the seat is uncovered immediately upon upward movement of the valve and a large flow area is provided to immediately reduce the thrust on paddle 12. Continued movement of the crank arm 40 will rapidly raise the paddle 12 as the mechanical advantage is reduced and the vertical component of movement of crank part 18 is increased. In order to prevent accidental closing of the valve, the crank arm is rotated until the slide block 21 comes into contact with side wall 43 of slot 24 with the valve in full open position and the central axis of crank part 18 to the left of a vertical center line of the journals 33.

In closing, the reverse action takes place and a low mechanical advantage fast acting movement of the paddle 12 is provided before the paddle 12 begins to pinch off flow and the downstream thrust across paddle 12 begins to substantially increase. As the thrust increases, the mechanical advantage of the system increases and excessive torque will not be required to move the paddle 12 to fully closed position.

Figure 6:
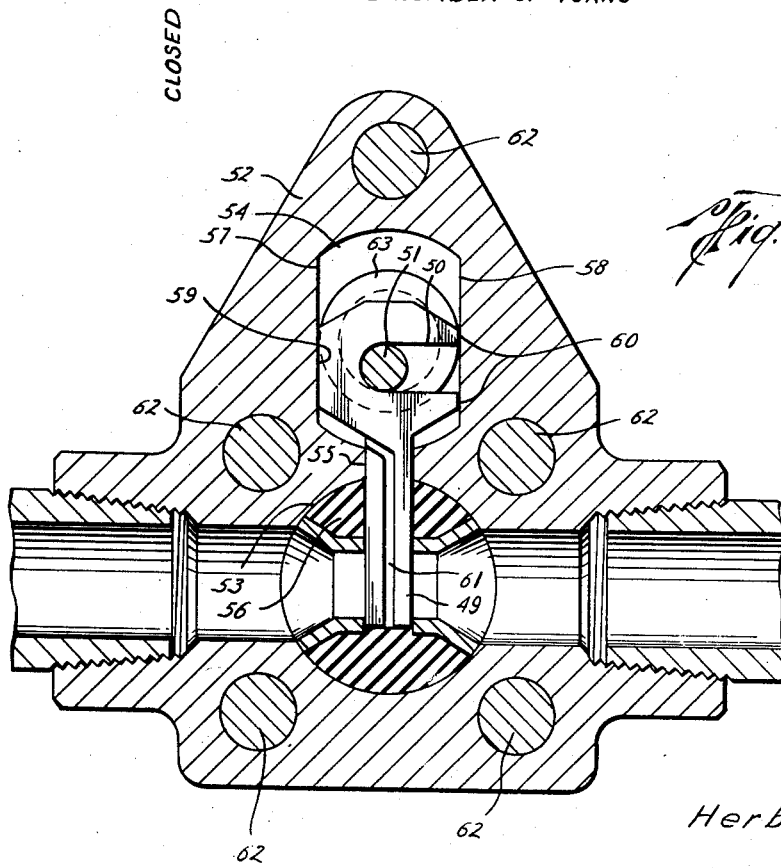
Fig. 6 is a view partly in elevation and partly in cross section of another form of this invention.

Referring now to Fig. 6, there is shown a modified form of valve. The valve member 49 is in one piece and is enlarged at its upper end to provide a horizontally extending slot 50 in which a crank pin 51 is mounted for rotative and sliding movement. The crank part 51 is in direct engagement with the walls 50 and therefore only line contact will occur between the parts resulting in more wear than in the case of the bearing block of the other form of invention. The casing 52 is provided with adjacent cavities 53 and 54. The two cavities are joined together by a slot 55 in which valve member 49 reciprocates. A seat insert 56 is positioned within cavity 53 and valve member 49 cooperates therewith to control flow through the valve casing. The cavity 54 is provided with opposite side walls 57 and 58 with which opposite flats 59 and 60 of valve member 49 are in sliding engagement to guide endwise movement of valve member 49.

Fluid communication between cavities 53 and 57 is provided by seepage on the upstream side of the valve member and by a groove 61 in the edge face of valve member 49 which extends from the bottom of the valve member to cavity 57.

A cover plate (not shown) is secured to and completes the valve casing 52. A plurality of bolts 62 may be utilized to sealingly secure the plate to the remainder of the casing.

The operation of this form of valve is substantially identical with that of the preferred form. The operating shaft 63 is journaled in the casing 52 and upon rotation of this shaft, the offset crank part 51 will rotate in a counter clockwise position while slidably and rotatably engaging the slot 50 in the valve member 49. A high mechanical advantage will be provided by this arrangement as the crank part 51 moves the valve member from its fully seated position as it will have a larger horizontal than vertical component of movement. As soon as the valve member begins to move upwardly, the mechanical advantage will reduce and greater increments of travel of the valve member for given increment of rotation of shaft 63 will quickly move the valve member to a position to fully open the passageway.

Figure 5:
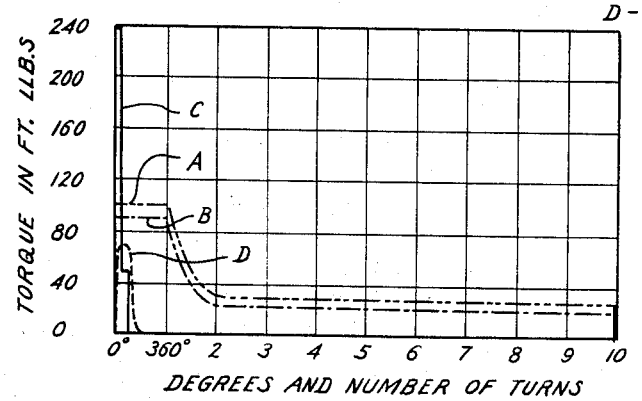
Fig. 5 is a graphical comparison of the valve of Fig. 1 with three known forms of mud valves.

Referring now to Fig. 5, there is shown a graphical illustration of the torque and work required for operation of three different valves now in drilling mud service as well as a curve of a valve constructed in accordance with this invention.

Curves A and B represent gate valves having resilient seats and a threaded stem which is moved along its axis by rotation of a nut. It will be noted that a large number of turns are required to open and close the valve and that a very small torque is required during eight of the ten turns necessary to close the valve. During the last two turns, the foot pounds of torque necessary to close the gate rapidly increases and levels off as the valve moves into fully seated position during the last 360 degrees of rotation.

Curve C represents a plug type valve used in drilling fluid control. While the degrees of turn to operate the valve are quite small, it will be noted that a very high torque is necessary to close the valve.

The curve of a valve constructed in accordance with this application is shown at D. It will be noted that the largest torque required is much less than that of either of the other three valves and the total work required is also less. The peak of the curve is reached when the valve member pinches off flow through the valve and even though the thrust across the valve member from this time until closing of the valve will be constant and the frictional resistance increasing due to larger area of contact between the valve member and seat, still the torque required for closing the valve will be decreased due to the increased mechanical advantage of the operator.

From the above it will be seen that the objects of this invention have been attained. There has been provided a valve for controlling drilling fluid or the like which may be quickly and easily opened and closed with minimum work and without excessive torque at any position of the valve member between open and closed position.

Provision is made for fluid pressure to reach the bonnet of the valve and due to the lack of a valve stem or other part moving into the valve, the usual pressure differential across the gate valve resisting its closing is done away with.

The valve member may be formed in two parts to permit ready replacement of the paddle portion of the valve member.

The bottom of the flow passageway through the valve is flattened out into a straight line so that the valve member will not block off flow through the passageway until the actuator parts have reached a position to give a high mechanical advantage so that there will be no increase in torque required to completely close the valve and move it into its fully seated position.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense. The invention having been described, what is claimed is:

1. A gate valve comprising, a valve casing with a flow passageway therethrough, a resilient valve seat transverse the passageway, a gate valve member within the casing mounted for endwise movement and cooperable with the seat to control flow through the passageway, said valve member in seating distorting the seat, guide means confining movement of the valve member to endwise movement between open and closed position, a slot in the gate valve member closed at one end to provide a stop and extending normal to the endwise direction of movement of the gate valve member, an actuator shaft journaled in the casing, said shaft having a crank part in sliding engagement with the slot, said crank part positioned, with the valve member preventing flow through the passageway, against said stop and on the stop side of a line normal to and passing through the rotational axis of the shaft and parallel to the endwise movement of the valve member to lock the valve member in fully closed position against the force of the distorted seat.

2. A gate valve, comprising a valve casing having a flow passageway therethrough, a gate movable within the valve casing to open and close the passageway, a valve seat transverse the passageway in position to be distorted by the gate as it is moved into closed position, an actuator shaft journaled in the casing for rotation about an axis normal to the movement of the gate, means including a crank part mounted eccentrically of the axis of the actuator shaft and engaging said gate to move it between opened and closed positions in response to rotation of the shaft, the axis of the crank part being movable, in closing the gate, toward and away from the passageway from one side of a line normal to and passing through the axis of the shaft and parallel to the movement of the gate to the other side of said line, respectively, and a stop positioned to limit said movement of the crank part away from the passageway and lock the gate in closed position due to the force of the distorted valve seat acting thereacross.

References Cited in the file of this patent

UNITED STATES PATENTS

| 1,633,690 | Wilson | June 28, 1927 |
| 2,329,315 | Allen | Sept. 14, 1943 |
| 2,544,160 | Hinrichs | Mar. 6, 1951 |
| 2,731,231 | Garrott | Jan. 17, 1956 |

FOREIGN PATENTS

| 46,711 | Denmark | 1933 |